United States Patent Office 3,562,295
Patented Feb. 9, 1971

3,562,295
MACROCYCLIC POLYETHER COMPOUNDS AND
IONIC COMPLEXES THEREOF
Charles J. Pedersen, Salem, N.J., assignor to E. I. du Pont de Nemours and Company, Wilmington, Del., a corporation of Delaware
No Drawing. Filed Dec. 18, 1968, Ser. No. 784,936
Int. Cl. C07d 19/00
U.S. Cl. 260—338
12 Claims

ABSTRACT OF THE DISCLOSURE

Macrocyclic polyether "crown" compounds consisting of oxygen atoms joined to adjoining oxygen atoms by chains of from 2 to 3 carbon atoms to form a polyether ring having from 15 to 30 atoms in the ring. Ring carbon atoms can be $C_1$-$C_4$ alkyl substituted. The crown compounds are prepared by ring closure of halo-polyether-alcohol compounds with, e.g., sodium hydride or potassium t-butoxide according to the Williamson synthesis. Crown compounds so prepared form complexes with a wide variety of ionic metal compounds, especially those of alkali metals and alkaline earth metals, making it possible to use certain chemical reagents in media wherein they are normally insoluble.

BACKGROUND OF THE INVENTION (1) Field of the invention

This invention relates to new macrocyclic polyether compounds, and to complexes with ionic metal compounds formed therewith.

(2) Description of the prior art

Heretofore, many chemical reagents useful in aqueous and alcoholic media have been unavailable for use in non-hydroxylated media wherein they are normally insoluble. For example, although potassium hydroxide is a commonly employed reagent and benzene a widely used solvent, it has not been possible to dissolve the former in the latter even though finely divided potassium hydroxide is vigorously stirred into boiling benzene. Again, though potassium permanganate is widely used as an oxidizing agent, it has not been possible to employ the same to oxidize, e.g., olefinic compounds in hydrocarbon media because of its insolubility therein. Sodium nitrite, a corrosion inhibitor of iron and steel in aqueous systems, has not heretofore been susceptible to that employment in nonaqueous systems. Thus, a need has existed for a means of carrying normally insoluble reagent substances into solution in non-hydroxylic media.

Cyclic polyethers having four or more oxygen atoms in the polyether ring have been prepared heretofore. A review of the pertinent literature is set out in C. J. Pedersen, J. Am. Chem. Soc. 89, 7017 (1967). In none of the literature reviewed is mention made of formation of stable complexes of the subject cyclic polyethers with salts of ionic metals such as alkali and alkaline earth metals.

BRIEF SUMMARY OF THE INVENTION

According to this invention there are provided macrocyclic polyether compounds. These compounds can form complexes with the cations of many metal compounds, particularly ionic alkali metal and alkaline earth metal compounds. The complexes are new analytical reagents for use in nonhydroxylated media wherein the uncomplexed metal compounds are normally insoluble.

Macrocyclic polyether compounds of the invention have from 15 to 30 ring atoms in the polyether ring and consist of from 5 to 10 —O—X— units wherein X for a particular compound is either (a) 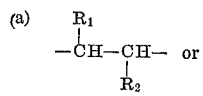   (b) 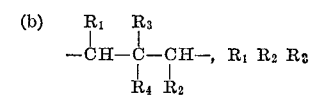

and $R_4$ being radicals independently selected from the group consisting of hydrogen and alkyl radicals having from 1 to 4 carbon atoms. When the —O—X— units comprise

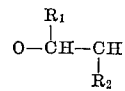

one of X can be (b).

DETAILED DESCRIPTION OF THE INVENTION

Molecular models of representative compounds of the present invention have an annular configuration suggestive of a crown, and accordingly, the macrocyclic polyethers of the present invention are denoted "crown" compounds. Complexes of these compounds with ionic metal compounds are denoted "crown" complexes.

The macrocyclic polyether compounds of the invention, in the broadest description, consist of oxygen atoms joined to adjoining oxygen atoms by chains of from 2 to 3 carbon atoms to form a polyether ring having from 15 to 30 atoms in the ring. The ring carbon atoms can be alkyl-substituted by alkyl groups of from one to four carbon atoms as described above. Preferably, alkyl substituents are $C_1$-$C_2$ alkyl to reduce steric hindrance in complexing. It is essential that the chains constituted by ring carbon atoms separating ring oxygens be maintained at from 2 to 3 carbon atoms in length to ensure reliable complexing. In general, large rings have no substantial advantage over compounds of moderate ring size. The preferred maximum number of ring atoms is 30. Very large rings are not preferred, as complexing power is diminished where the ring and ion to be complexed do not constitute a good "fit." The crown compounds are described herein as consisting of from 5 to 10 —O—X— groups wherein X is a divalent alkylene radical including but not limited to the carbon chain actually in the polyether ring. The nomenclature employed to describe the crown compounds will be apparent from the following structural formula of a representative compound of the invention, 1,4,7,10,13,16-hexaoxacyclooctadecane (i.e., 6 oxygens in the positions indicated in a ring having 18 ring atoms):

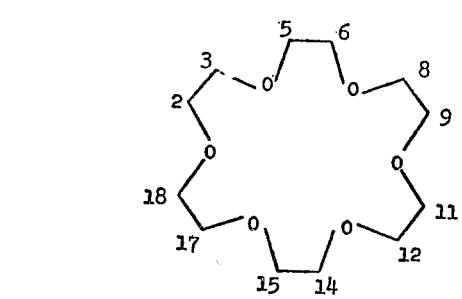

In the structure depicted, ring carbon atoms constituting the oxygen-separating chains are numbered. In the particular instance illustrated, the ring carbon atoms are not alkyl- or otherwise substituted. A typical —O—X— group, as that term is employed herein, is shown at positions 1, 2, 3 (i.e., —O—$CH_2$—$CH_2$—).

The general procedure for the synthesis of the crown compounds is an adaptation of the so-called Williamson synthesis wherein ethers are produced by the interaction of an alkyl halide and an alkali alkoxide. The latter reactant results from abstraction of hydrogen from an alcohol functional group with strong base, such as sodium hydride or potassium t-butoxide. For present purposes a linear polyether having halide and alkoxide functions at opposite ends thereof is chosen to prepare the crown compound. The desired product is yielded through ring closure with the Williamson reaction. A typical reaction in which this approach to the crown compounds is employed is as follows:

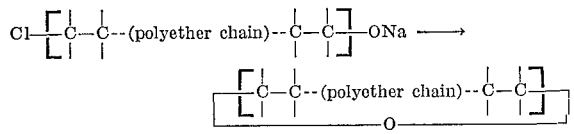

Alternatively, two polyether chains each terminally substituted as above can be joined to form a ring. Naturally, the character of the crown compound produced depends upon the particular halo-polyether-alcohol chosen for reaction with base to form the alkoxide intermediate in the ring closure reaction. For example, where the desired product is a 24-membered unsubstituted ring having oxygen atoms separated by 3-carbon chains, the reactant chosen is Cl—$(CH_2)_3$—[—O—$(CH_2)_3$—]—$_5$OH. The structure of the crown desired will in every case dictate which halo-polyether-alcohol reactant is to be employed. Generally, where the product intended is alkyl-substituted, the alkyl side-chains will be present on the polyether reactant before ring closure.

Generally, the crown compounds are made in a solvent for both reactants and product. Representative solvent systems include lower alkyl diether derivatives of ethylene glycol or polyethylene glycols having a normal boiling point below 150° C.; dioxane; and mixtures of ethers. 1,2-dimethoxyethane is preferred. The amount of solvent needed can be selected on the basis of operating convenience for a particular set of reactants.

The reaction can be carried out over a wide range of temperatures. For operating convenience, temperatures from about 60° C. to about 140° C. are preferred. The reaction time will vary depending upon the temperature and other factors. Other conditions being equal, the higher the temperature the shorter the time. Typically, time can range from about 6 hours to about 24 hours. The progress of the reaction can be followed by analyzing the mixture for inorganic chloride. The most suitable time and temperature for particular reactants can be determined by routine experimentation.

The crown compound can be isolated by conventional methods such as by concentration of the reaction mixture, chromatographic separation, and mechanical collection of insoluble (or precipitated) product. The crown compounds are chromatographed on acid-washed alumina or silica gel which retains hydroxylated open chain polyethers; the crown is eluted with readily volatile hydrocarbons such as heptane. Identification of the crown compounds is based on elementary C, H, O analysis, molecular weight and n.m.r. spectrum. Recrystallization of the purified product can be undertaken to improve its crystalline form. Infrared spectrum can be employed for confirmation.

The halo-polyether-alcohols employed in the ring closure reaction can be synthesised by conventional reactions. One convenient preparation where starting materials are commercially available involves reaction of 1 mole of an α-ω-dihalopolyether with at least 1 mole of an α-ω-dihydroxypolyether in the presence of 1 mole alkali metal hydroxide, e.g.,

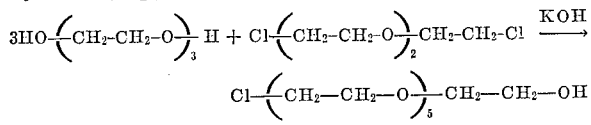

The dihydroxy compound can serve as the solvent.

To produce a linear polyether reactant wherein the oxygen atoms are separated by 2-carbon chains, one alternative is to use oxirane polymerization in base to build a dihydroxypolyether of the desired length, then chlorination to produce the halogen functional group. A typical reaction of this nature is as follows:

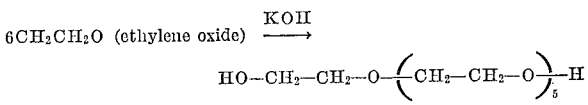

The dihydroxy polyether is then monochlorinated, as with 1 mole of thionyl chloride per mole of dihydroxy polyether in the presence of an acid acceptor such as pyridine to form the halopolyether-alcohol intermediate. For the instance where the oxygens of the ultimate ring are separated by 2 carbon atoms (i.e., X in the —O—X— groups constituting the ring is

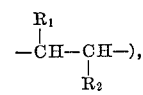

the oxiranes are chosen to yield the desired oxygen-separating alkylene radical. Thus, where $R_1$ and $R_2$ are hydrogen, ethylene oxide is employed; where $R_1$ is hydrogen and $R_2$ is methyl, propylene oxide is employed; where $R_1$ is hydrogen and $R_2$ is ethyl, 1,2-epoxybutane is employed; where $R_1$ and $R_2$ are methyl, 2,3-epoxybutane is employed, etc.

Rings having one 3-carbon chain interposed between two adjoining ring oxygens, the remaining oxygens being separated by 2-carbon chains, can be prepared by oxirane polymerization initiated by trimethylene chlorohydrins to produce the halo-polyether-alcohol intermediates, e.g.,

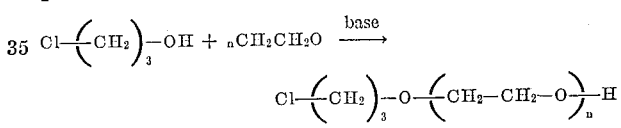

followed by ring-closure as described above.

Where 3-carbon separation between ring oxygens is intended, the oxirane polymerization alternative is not available for intermediate formation. Instead, trimethylene chlorohydrins can be serially reacted by the Williamson synthesis to give the intermediate, e.g.,

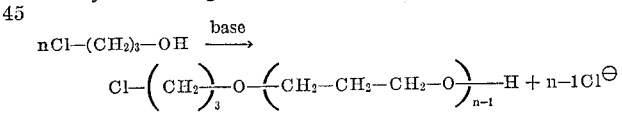

On the other hand, this approach is not recommended to produce the 2-carbon separation because of the tendency of ethylene chlorohydrin to ring-close in the presence of base, forming ethylene oxide.

In each of the above-listed preparations, the statistical nature of the reaction permits formation of by-products such as dichloride- or dihydroxy-terminated polyethers. The variance in solubility and other properties of these by-products from properties of the desired intermediate permit their separation by conventional techniques. The preparations listed are merely representative of conventional approaches to linear polyether formation. Other suitable methods will occur to the art-skilled: see, for example, the stannic chloride-catalyzed preparation in J. Am. Chem. Soc. 79, 897 (1957).

Crown complexes described hereinabove can form novel complexes with the cations of many metal compounds. Particularly noteworthy are the complexes formed with ionic alkali metal compounds and with ionic alkaline earth metal compounds wherein the alkaline earth metal has an atomic weight greater than 40. Magnesium and beryllium compounds appear too covalent to form complexes of this character.

The complexes appear to be electrostatic in character. Generally, it is believed that when complexed the cation is located in the center of the macrocyclic polyether ring. Accordingly, the closer the fit between ionic radius and hole size, the stronger the complexing. In some cases where the ionic radius is larger than is optimal for a given crown compound, the molar ratio of crown compound to cation is 2:1 or 3.2. For example, with a hexaoxacyclooctadecane ring and $Rb^{\oplus}$, the ratio can be 1:1 or 2:1; and with $Cs^{\oplus}$, the ratio can be 2:1 or 3:2. Otherwise, complexing of the cation with crown compound occurs in a 1:1 ratio.

In addition to the relative sizes of the cation and the hole in the polyether ring, the following factors influence the formation and stability of the complexes: (1) the number of oxygen atoms in the polyether ring, (2) the coplanarity of the oxygen atoms, (3) the symmetrical placement of the oxygen atoms, (4) the absence of steric hindrance in the ring, (5) the tendency of the cation to associate with the solvent in which complexation occurs, and (6) the electrical charge on the ion. The crown compounds and complexes claimed herein are defined in such manner as to maximize formation and stability of complexes in the light of the above factors. For example, the crown compound preferably contains from 5 to 6 oxygen atoms symmetrically placed so as to achieve coplanarity. Again, ring oxygens are separated by no more than 3 carbon atoms and substituents on the ring preferably are $C_1$–$C_2$ alkyl to minimize steric hindrance.

The complexes of the macrocyclic polyethers with compounds of alkali metals or alkaline earth metals can be prepared by one or more of the following methods:

Method 1—Polyether and metal compound are dissolved in a solvent which dissolves each and which is later removed by evaporation from the resulting complex, usually under vacuum.

Method 2—Polyether and the metal compound are dissolved in a minimum quantity of hot solvent which dissolves each, the resulting complex being precipitated by cooling and mechanically separated, e.g., by filtration, centrifugation, etc.

Method 3—Polyether is heated with the metal compound in a solvent in which only the latter is readily soluble, the polyether being converted into a crystalline complex without the system ever becoming a clear solution. The complex is recovered by filtration.

Method 4—Polyether is warmed with thorough mixing with the metal compound. No solvent is used.

Method 5—A benzene solution of cyclic ether-potassium hydroxide complex of known concentration is reacted with a protonated anion, e.g. (cyclic ether-KOH)-+$NH_3$→(cyclic ether-$KNH_2$)+$H_2O$

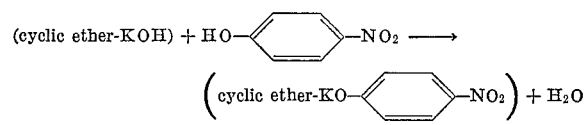

The water formed in the reaction can either be left in the solution or removed, if possible, with a chemically inert drying agent or by azeotropic distillation. The solid complex, if desired, can be obtained by removing the benzene under vacuum. When isolation of the crown complex is undesirable because of its instability in pure form, it can be used in the solvent in which it was prepared.

In general, complexes prepared according to this invention can solubilize complexed metal compounds in non-aqueous or non-alcoholic media wherein they are normally insoluble. This property alone suggests manifold applications of the invention in industry. For example, the benzene-soluble potassium hydroxide complex can be employed to initiate the anionic polymerization of acrylonitrile or pivalolactone, a hydroxyl-terminated polymer product resulting. It can also be used as a soluble acid-acceptor in nonprotic systems. The benzene-soluble sodium nitrite complex can be used as a corrosion inhibitor of iron and steel in non-aqueous systems, and to effect the diazotization and nitrosation of amino compounds in media in which they are normally insoluble. The benzene-soluble potassium permanganate complex can be used to oxidize olefinic compounds. In general, then, nearly any reaction in which the uncrowned metal compound can participate in aqueous or alcoholic media can be carried out in non-hydroxylic media by using the corresponding crowned reagents.

The crown compounds are useful for the separation of dissolved salts. The salt which can form a crown complex can thereafter be extracted by an immiscible solvent which cannot dissolve the uncomplexed salts present. By way of illustration, water soluble salts that form crowned complexes can be separated from salts that do not; a water-insoluble solvent for the complex is employed for the extraction. For example, 1,4,7,10,13,16-hexaoxacyclooctadecane does not complex with magnesium ion; hence, potassium salts can be separated from magnesium salts by this method.

Hydrocarbon soluble complexes of the cyclic polyether "crowns" with potassium hydroxide or potassium salts of weakly acidic compounds (e.g., 2-ethyl-hexanoic acid and m-nitrophenol) are strong catalysts for the polymerization of formaldehyde and the trimerization of isocyanates.

Benzene-soluble complexes of potassium hydroxide also bring about the alkaline hydrolysis of the esters of 2,4,6-trimethylbenzoic acid; this is a surprising result since these esters are normally very resistant to alkaline hydrolysis and appear to be unaffected by prolonged boiling with potassium hydroxide itself.

A benzene-soluble complex of cyclic polyether "crown" with potassium hydroxide also causes a solution of 5-amino-2,3-dihydro-1,4-phthalazinedione (Luminol) in dimethylformamide or dimethyl sulfoxide to chemiluminesce brilliantly in air. It also ionizes metal-free phthalocyanine to give a benzene solution of the phthalocyanine anions which regenerate the phthalocyanine by protonation.

The following examples are illustrative of compounds and processes of the present invention. Parts and percentages are by weight unless otherwise noted. The reactions in these examples are generally carried out in a flask equipped with a thermometer, a reflux condenser, and an agitator.

EXAMPLE 1

Preparation of and complexation with 1,4,7,10,13,16-hexaoxacyclooctadecane (A) Preparation of 17-chloro-3,6,9,12,15-pentaoxaheptadecanol.—Triethylene glycol,

and triglycol dichloride,

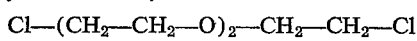

are reacted with base to prepare the heptadecanol intermediate. Both starting materials are available, e.g., from the Union Carbide Corporation.

To a 3-liter flask are added 900 g. (6 moles) triethylene glycol plus 132 g. (2 moles) of 85% potassium hydroxide. After warming the flask to dissolve caustic, 374 g. (2 moles) of triglycol dichloride are added and temperature in the flask is maintained at from about 93 to 112° C. by an electric mantel over the reaction period of about 22 hours. At the conclusion of this period, the reaction mixture is filtered and the amber filtrate, 1193.3 g., concentrated in a rotary evaporator, yielding a residue of 298.5 g. The residue is filtered and solids washed with benzene. Combined wash solution and filtrate, 268 g., are roto-distilled at 0.5 mm. and a 175.2 g. distillate cut taken. The distillate is put on a column of acid-washed alumina gel and eluted with benzene to give 69.3 g. of the desired product, 17-chloro-3,6,9,12,15-pentaoxaheptadecanol. Elementary composition and molecular weight data confirm the structure.

(B) Preparation of 1,4,7,10,13,16-hexaoxacyclooctadecane.—A mixture of 32.5 g. (0.108 mole) of 17-chloro- 3,6,9,12,15-pentaoxaheptadecanol prepared as in part A, 700 ml. of 1,2-dimethoxyethane solvent, and 14.2 g. (0.108 mole) of 90.5% potassium t-butoxide is brought to reflux under nitrogen with vigorous agitation. The distillate (200 ml.) is removed at 85.5° and the remainder refluxed for 23 hours.

The mixture is then acidified with 25 ml. of concentrated hydrochloric acid, cooled, filtered, and evaporated under vacuum. The resulting residue, 30.2 g., is dissolved in 200 ml. of chloroform; the mixture thus formed is filtered to remove inorganic materials and concentrated. The resulting residue, typically 25.3 g., is put on a column of acid-washed alumina and eluted with n-heptane. The column retains unreacted starting compound and any other hydroxylic compounds present as by products. Evaporation of the entire eluate gives a colorless, viscous liquid that solidifies when contacted with a crystal of sodium chloride. This is the desired product, 1,4,7,10,13,16-hexaoxacyclooctadecane, as confirmed by elementary composition, molecular weight, and NMR spectrum. On crystallization from petroleum ether white crystals are obtained.

When sodium hydride is employed in lieu of potassium t-butoxide, the desired product is obtained in about the same proportion.

(C) Complexation with 1,4,7,10,13,16-hexaoxacyclooctadecane.—By way of illustration, the extraction of alkali metal and alkali earth metal compounds from aqueous solution into methylene chloride is described.

Two immiscible solutions are separately prepared: an aqueous solution 0.1 molar in metal hydroxide, and a methylene chloride solution 0.00007 molar in both crown compound and picric acid. The concentrations in the latter solution are employed to obtain extinction coefficients in a range convenient for spectrophotometric measurement, i.e., below an optical density of 1.5. The two solutions are shaken together and allowed to separate.

The situation now existing can be summarized as follows. It is believed that the small, very polar hydroxide ion remains in polar water and shuns the less polar methylene chloride when picrate ion is present to compete with it. Picrate anion being larger and less polar than hydroxide ion, can go into methylene chloride. Uncomplexed crown compound tends to remain in methylene chloride. The concentration of complexed metal ion is negligible in the aqueous phase. The picric acid is completely converted to metal picrate. Uncomplexed metal picrates are insoluble in methylene chloride and impart no observable color to it. If no crown compound were present, nearly all of the picrate would be in the aqueous layer and its color would be substantially that of 0.00007 molar picrate. Depending on the efficiency of the crown compound as a complexing agent for the metal ion, the yellow picrate color is distributed between the two phases. The higher the extraction efficiency of the crown compound, the more intense the yellow color of the methylene chloride layer.

The percent extraction of metal picrate is obtained by determining spectrophotometrically the picrate absorption of the methylene chloride layer, which is colorless in the absence of the complexed picrate. The following data are typically obtained:

TABLE I

| Metal picrate: | Percent of maximum possible extracted |
|---|---|
| $Li^\oplus$ | 1.6 |
| $Na^\oplus$ | 5.6 |
| $K^\oplus$ | 53.7 |
| $Rb^\oplus$ | 46.0 |
| $Cs^\oplus$ | 27.6 |
| $Ba^{2\oplus}$ | 2.0 |

EXAMPLE 2

Complexation with crown compounds having 5,7,8, and 10 oxygen atoms in the polyether ring To prepare the following crown compounds and complexes with metal picrate, the general procedures of Example 1 can be followed:

(a) 1,4,7,10,13-pentaoxacyclopentadecane
(b) 1,4,7,10,13,16,19-heptaoxacycloheneicosane
(c) 1,4,7,10,13,16,19,22-octaoxacyclotetracosane
(d) 1,4,7,10,13,16,19,22,25,27-decaoxacyclotriacontane.

It is estimated that spectrophotometric data of the order given in Table II will be obtained:

TABLE II.—METAL PICRATE EXTRACTED: PERCENT OF MAXIMUM POSSIBLE

| | $Li^\oplus$ | $Na^\oplus$ | $K^\oplus$ | $Cs^\oplus$ |
|---|---|---|---|---|
| Crown compound: | | | | |
| (a) | 1 | 9 | 3 | 2 |
| (b) | 1 | 5 | 35 | 30 |
| (c) | 1 | 2 | 14 | 11 |
| (d) | 1 | 4 | 30 | 27 |

In addition to the alkali metal and alkaline earth metal compounds disclosed as preferred candidates for complexation, the crown compounds of the invention will be found to complex with cations of other ionic compounds. For example, crown compounds prepared according to the invention form complexes with ionic compounds of $Cu^\oplus$, $Ag^\oplus$, $Au^\oplus$, $NH_4^\oplus$, $RNH_3^\oplus$, $Hg^\oplus$, $Hg^{2\oplus}$, $Tl^\oplus$, $Pb^{2\oplus}$, $Ce^{3\oplus}$, and the like. In addition to the alkyl side chains disclosed above, the crown compounds can contain unsaturated side chains, as where olefinic epoxides are employed to produce the halo-polyether-alcohol intermediate. Again, so long as unduly non-symmetrical crowns are not obtained, mixed reactants can be employed in producing the intermediates, ultimately yielding crown compounds having, e.g., ring oxygens alternately separated by 2-carbon and 3-carbon chains. Other variations within the spirit and scope of the invention will be apparent to the art-skilled in light of the disclosure hereinabove.

What is claimed is:

1. A macrocyclic polyether compound having from 15 to 30 ring atoms and consisting of from 5 to 10 —O—X— units wherein X for a particular compound is either

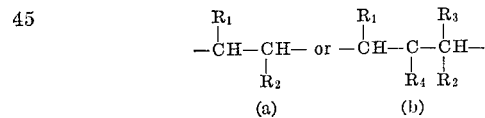

$R_1$, $R_2$, $R_3$, and $R_4$ being radicals independently selected from the group consisting of hydrogen and $C_1-C_4$ alkyl; with the proviso that when the —O—X— units comprise

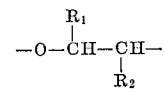

one of X can be (b).

2. A compound according to claim 1 wherein for a particular compound each X is (a) or each X is (b).

3. A compound according to claim 2 wherein each X is (a), and wherein $R_1$ is hydrogen and $R_2$ is hydrogen, methyl or ethyl.

4. A compound according to claim 2 wherein each X is (b).

5. A compound according to claim 3 consisting of 5 to 6 —O—X— units and wherein $R_2$ is hydrogen or methyl.

6. A compound according to claim 3 consisting of 6 —O—X— units wherein $R_2$ is hydrogen.

7. A complex of:
(A) a macrocyclic polyether compound having from 15 to 30 ring atoms and consisting of from 5 to 10

—O—X— units wherein X for a particular compound is either

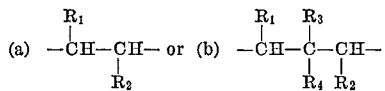

$R_1$, $R_2$, $R_3$, and $R_4$ being radicals independently selected from the group consisting of hydrogen and $C_1$-$C_4$ alkyl; with the proviso that when the —O—X— units comprise

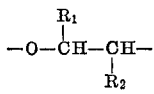

one of X can be (b); and (B) an alkaline metal or alkaline earth metal compound, the alkaline earth metal having an atomic weight greater than 40.

8. A complex according to claim 7 wherein for a particular polyether compound each X is (a) or each X is (b).

9. A complex according to claim 7 wherein each X is (a) and wherein $R_1$ is hydrogen and $R_2$ is hydrogen, methyl, or ethyl.

10. A complex according to claim 7 wherein each X is (b).

11. A complex according to claim 8 wherein the said polyether compound consists of 5 to 6 —O—X— units and wherein $R_2$ is hydrogen or methyl.

12. A complex according to claim 8 wherein the said polyether compound consists of 6 —O—X— units and wherein $R_1$ and $R_2$ are hydrogen.

References Cited
UNITED STATES PATENTS 2,069,336   2/1937   Schmidt et al. _____ 260—615
2,293,868   8/1942   Toussaint _____ 260—338

NORMA S. MILESTONE, Primary Examiner

U.S. Cl. X.R.

260—88.3, 88.7, 141, 248, 314.5, 515, 615, 622, 687

UNITED STATES PATENT OFFICE
CERTIFICATE OF CORRECTION

Patent No. 3,562,295　　　　　　　Dated February 9, 1971

Inventor(s) Charles J. Pedersen

It is certified that error appears in the above-identified patent and that said Letters Patent are hereby corrected as shown below:

In the specification, page 1, column 2, line 11, the formula should read as follows:

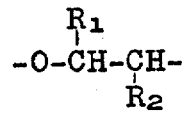

In the claims, Claim 1, formula (b) should read as follows:

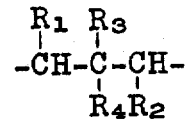

Claim 7, (B), "an alkaline metal" should read -- an alkali metal -- .

Signed and sealed this 22nd day of August 1972.

(SEAL)
Attest:

EDWARD M. FLETCHER, JR.　　　　ROBERT GOTTSCHALK
Attesting Officer　　　　　　　　Commissioner of Patents